US012518748B1

(12) United States Patent
Liang et al.

(10) Patent No.: US 12,518,748 B1
(45) Date of Patent: Jan. 6, 2026

(54) SYSTEMS AND METHODS FOR AUTOMATIC SCREEN CAPTURES BY A VIRTUAL MEETING PARTICIPANT

(71) Applicant: Otter.ai, Inc., Mountain View, CA (US)

(72) Inventors: Sam S. Liang, Palo Alto, CA (US); Yun Fu, Cupertino, CA (US); Amro A. Younes, Redwood City, CA (US); Wen Sun, Sunnyvale, CA (US); Cheng Yuan, San Jose, CA (US); Alexandros Koumparoulis, Mountain View, CA (US); Richard B. Tasker, Sunnyvale, CA (US); Bisrat G. Moges, San Francisco, CA (US); Neal Granger, Victoria (CA); Stephen Phung, New Westminster (CA)

(73) Assignee: Otter.ai, Inc., Mountain View, CA (US)

( * ) Notice: Subject to any disclaimer, the term of this patent is extended or adjusted under 35 U.S.C. 154(b) by 0 days.

(21) Appl. No.: 18/438,145

(22) Filed: Feb. 9, 2024

Related U.S. Application Data

(60) Provisional application No. 63/444,798, filed on Feb. 10, 2023.

(51) Int. Cl.
  *G10L 15/18* (2013.01)
  *G06F 21/62* (2013.01)
  (Continued)

(52) U.S. Cl.
  CPC ........ *G10L 15/183* (2013.01); *G06F 21/6218* (2013.01); *G06T 1/0021* (2013.01);
  (Continued)

(58) Field of Classification Search
  CPC . G10L 15/183; G06F 21/6218; G06T 1/0021; G06V 10/26; G06V 10/761; G06V 10/764
  See application file for complete search history.

(56) References Cited

U.S. PATENT DOCUMENTS

| 6,088,669 A | 7/2000 | Maes |
| 6,363,352 B1 | 3/2002 | Dailey et al. |
| (Continued) | | |

FOREIGN PATENT DOCUMENTS

| CN | 111164676 | 5/2020 |
| JP | 3376487 | 5/2001 |
| (Continued) | | |

OTHER PUBLICATIONS

Basu et al., "An Overview of Speaker Diarization: Approaches, Resources and Challenges," 2016 Conference of the Oriental Chapter of International Committee for Coordination and Standardization of Speechx Databases and Assessment Technique (O-COCOSDA), Bali, Indonesia, Oct. 26-28, 2016.
(Continued)

*Primary Examiner* — Qian Yang
(74) *Attorney, Agent, or Firm* — Faegre Drinker Biddle & Reath LLP

(57) ABSTRACT

Method, system, device, and non-transitory computer-readable medium for transcribing a conversation. In some embodiments, a computer-implemented method for transcribing a conversation, the method comprising: obtaining, via a virtual participant, a set of audio data associated with a conversation while the conversation occurs; transcribing, via the virtual participant, the set of audio data into a set of text data while the conversation occurs; receiving a set of screen captures associated with the conversation; deduplicating the set of screen captures to generate a set of deduplicated screen captures; and generating a transcript of the conversation based at least in part on the set of text data and the set of deduplicated screen captures.

10 Claims, 5 Drawing Sheets

(51) Int. Cl.
*G06T 1/00* (2006.01)
*G06V 10/26* (2022.01)
*G06V 10/74* (2022.01)
*G06V 10/764* (2022.01)
*G10L 15/183* (2013.01)

(52) U.S. Cl.
CPC ............ *G06V 10/26* (2022.01); *G06V 10/761* (2022.01); *G06V 10/764* (2022.01)

(56) References Cited

U.S. PATENT DOCUMENTS

| | | |
|---|---|---|
| 6,434,520 B1 | 8/2002 | Kanevsky et al. |
| 6,513,003 B1 | 1/2003 | Angell et al. |
| 8,407,049 B2 | 3/2013 | Cromack et al. |
| 8,612,211 B1 | 12/2013 | Shires et al. |
| 8,645,138 B1 | 2/2014 | Weinstein |
| 8,818,803 B2 | 8/2014 | Weber |
| 9,311,932 B2 | 4/2016 | Carter |
| 9,443,518 B1* | 9/2016 | Gauci ................... G06F 40/169 |
| 9,571,652 B1 | 2/2017 | Zeppenfeld et al. |
| 10,339,918 B2 | 7/2019 | Hofer et al. |
| 10,388,272 B1 | 8/2019 | Thomson et al. |
| 10,573,312 B1 | 2/2020 | Thomson et al. |
| 10,616,278 B1 | 4/2020 | Johansson et al. |
| 10,630,733 B2 | 4/2020 | Modai et al. |
| 10,978,073 B1 | 4/2021 | Fu et al. |
| 11,012,575 B1 | 5/2021 | Leblang et al. |
| 11,017,778 B1 | 5/2021 | Thomson et al. |
| 11,024,316 B1 | 6/2021 | Fu et al. |
| 11,100,943 B1 | 8/2021 | Fu et al. |
| 11,222,185 B2 | 1/2022 | Waibel et al. |
| 11,330,229 B1 | 5/2022 | Crumley et al. |
| 11,330,299 B2 | 5/2022 | Huo |
| 11,423,911 B1 | 8/2022 | Fu et al. |
| 11,431,517 B1 | 8/2022 | Fu et al. |
| 11,657,822 B2 | 5/2023 | Fu et al. |
| 11,676,623 B1 | 6/2023 | Younes et al. |
| 11,869,508 B2 | 1/2024 | Fu et al. |
| 12,020,722 B2 | 6/2024 | Fu et al. |
| 12,080,299 B2 | 9/2024 | Lau et al. |
| 12,182,502 B1 | 12/2024 | Nakajima et al. |
| 2002/0099552 A1 | 7/2002 | Rubin et al. |
| 2004/0107256 A1 | 6/2004 | Odenwald et al. |
| 2004/0117446 A1 | 6/2004 | Swanson |
| 2005/0034079 A1 | 2/2005 | Gunasekar et al. |
| 2005/0152523 A1 | 7/2005 | Fellenstein et al. |
| 2006/0149558 A1 | 7/2006 | Kahn et al. |
| 2006/0182249 A1 | 8/2006 | Archambault et al. |
| 2007/0071206 A1 | 3/2007 | Gainsboro et al. |
| 2007/0106724 A1 | 5/2007 | Gorti et al. |
| 2007/0118374 A1 | 5/2007 | Wise et al. |
| 2007/0183458 A1 | 8/2007 | Bouazizi et al. |
| 2008/0181417 A1 | 7/2008 | Pereg et al. |
| 2008/0293443 A1 | 11/2008 | Pettinato |
| 2008/0294434 A1 | 11/2008 | Pettinato |
| 2008/0300872 A1 | 12/2008 | Basu et al. |
| 2009/0019367 A1 | 1/2009 | Cavagnari et al. |
| 2009/0030680 A1 | 1/2009 | Mamou |
| 2009/0210391 A1 | 8/2009 | Hall et al. |
| 2009/0240488 A1 | 9/2009 | White et al. |
| 2009/0306981 A1 | 12/2009 | Cromack et al. |
| 2009/0307189 A1 | 12/2009 | Bobbitt et al. |
| 2010/0146438 A1 | 6/2010 | Bush et al. |
| 2011/0228922 A1 | 9/2011 | Dhara et al. |
| 2011/0307241 A1 | 12/2011 | Waibel et al. |
| 2011/0320197 A1 | 12/2011 | Conejero et al. |
| 2012/0046936 A1 | 2/2012 | Kandekar et al. |
| 2012/0253805 A1 | 10/2012 | Rajakumar et al. |
| 2012/0275761 A1 | 11/2012 | Li et al. |
| 2012/0281921 A1* | 11/2012 | Dowell .................. G06T 3/14 382/195 |
| 2012/0310644 A1 | 12/2012 | Zimmerman et al. |
| 2012/0323575 A1 | 12/2012 | Gibbon et al. |
| 2012/0324355 A1 | 12/2012 | Mbenkum et al. |
| 2013/0144603 A1 | 6/2013 | Lord et al. |
| 2013/0300939 A1 | 11/2013 | Chou et al. |
| 2013/0311177 A1 | 11/2013 | Bastide et al. |
| 2013/0346077 A1 | 12/2013 | Mengibar et al. |
| 2014/0029757 A1 | 1/2014 | Aronowitz et al. |
| 2014/0134576 A1 | 5/2014 | Edge |
| 2014/0136999 A1 | 5/2014 | Leibovich et al. |
| 2014/0207449 A1 | 7/2014 | Johnson |
| 2015/0012844 A1 | 1/2015 | Paulik et al. |
| 2015/0206544 A1 | 7/2015 | Carter |
| 2015/0249747 A1 | 9/2015 | Box et al. |
| 2015/0255068 A1 | 9/2015 | Kim et al. |
| 2015/0310863 A1 | 10/2015 | Chen et al. |
| 2016/0004732 A1 | 1/2016 | Hsu et al. |
| 2016/0014222 A1 | 1/2016 | Chen et al. |
| 2016/0284354 A1 | 9/2016 | Chen et al. |
| 2016/0322049 A1 | 11/2016 | Bakshi et al. |
| 2017/0068423 A1 | 3/2017 | Napolitano |
| 2017/0068670 A1 | 3/2017 | Orr |
| 2017/0070706 A1 | 3/2017 | Ursin et al. |
| 2017/0169816 A1 | 6/2017 | Blandin et al. |
| 2017/0180780 A1* | 6/2017 | Jeffries ............ H04N 21/43072 |
| 2017/0199934 A1 | 7/2017 | Nongplur |
| 2017/0294184 A1 | 10/2017 | Bradley |
| 2017/0301037 A1 | 10/2017 | Baughman et al. |
| 2017/0329943 A1* | 11/2017 | Choi ....................... G06F 21/16 |
| 2017/0372693 A1 | 12/2017 | Rangarajan Sridhar et al. |
| 2018/0007060 A1 | 1/2018 | Leblang et al. |
| 2018/0012598 A1 | 1/2018 | Thirukovalluru et al. |
| 2018/0032226 A1 | 2/2018 | Ryu et al. |
| 2018/0061083 A1* | 3/2018 | Suzuki ..................... G06T 7/90 |
| 2018/0143956 A1 | 5/2018 | Skarbovsky et al. |
| 2018/0174108 A1 | 6/2018 | Kang et al. |
| 2018/0197548 A1 | 7/2018 | Palakodety et al. |
| 2018/0315428 A1 | 11/2018 | Johnson et al. |
| 2018/0316893 A1 | 11/2018 | Rosenberg et al. |
| 2019/0073640 A1 | 3/2019 | Odezue et al. |
| 2019/0273767 A1 | 9/2019 | Nelson et al. |
| 2019/0341050 A1 | 11/2019 | Diamant et al. |
| 2019/0364009 A1 | 11/2019 | Joseph et al. |
| 2020/0051582 A1 | 2/2020 | Gilson |
| 2020/0145616 A1 | 5/2020 | Nassar |
| 2020/0175961 A1 | 6/2020 | Thomson et al. |
| 2020/0228358 A1 | 7/2020 | Rampton |
| 2020/0243095 A1 | 7/2020 | Adlersberg et al. |
| 2020/0257587 A1* | 8/2020 | Chau .................. G06F 11/0769 |
| 2020/0311122 A1 | 10/2020 | Ramamurthy |
| 2020/0365160 A1 | 11/2020 | Nassar et al. |
| 2020/0403818 A1 | 12/2020 | Daredia et al. |
| 2020/0412564 A1 | 12/2020 | Roedel et al. |
| 2021/0021558 A1 | 1/2021 | Mahmoud et al. |
| 2021/0044645 A1 | 2/2021 | Jayaweera |
| 2021/0058263 A1 | 2/2021 | Fahrendorff et al. |
| 2021/0058517 A1 | 2/2021 | Serbajlo et al. |
| 2021/0092168 A1 | 3/2021 | Ranalli et al. |
| 2021/0150211 A1 | 5/2021 | Ahmad Hambaly et al. |
| 2021/0217420 A1 | 7/2021 | Fu et al. |
| 2021/0319797 A1 | 10/2021 | Fu et al. |
| 2021/0327454 A1 | 10/2021 | Fu et al. |
| 2021/0367802 A1 | 11/2021 | Yarlagadda |
| 2021/0369042 A1 | 12/2021 | Gustman et al. |
| 2021/0374391 A1 | 12/2021 | Jorasch |
| 2021/0390144 A1 | 12/2021 | Ganesh |
| 2021/0407520 A1 | 12/2021 | Neckermann et al. |
| 2021/0409547 A1 | 12/2021 | Channapragada et al. |
| 2022/0122436 A1* | 4/2022 | Volkerink .............. G06V 20/10 |
| 2022/0343918 A1 | 10/2022 | Fu et al. |
| 2022/0353102 A1 | 11/2022 | Lau et al. |
| 2022/0385758 A1* | 12/2022 | Tadesse .................. G10L 25/51 |
| 2022/0398544 A1 | 12/2022 | Chung et al. |
| 2022/0414130 A1 | 12/2022 | Master Ben-Dor |
| 2023/0245660 A1 | 8/2023 | Fu et al. |
| 2023/0267948 A1 | 8/2023 | Younes et al. |
| 2023/0297765 A1 | 9/2023 | Vendrow |
| 2023/0325611 A1* | 10/2023 | Garg .................. G06V 30/19167 |
| 2024/0037145 A1* | 2/2024 | Ziccardi .................. G06F 40/56 |
| 2024/0087574 A1 | 3/2024 | Fu et al. |
| 2024/0095440 A1* | 3/2024 | Rony .................... G06F 40/40 |
| 2024/0127804 A1 | 4/2024 | Shirodkar et al. |

(56) References Cited

U.S. PATENT DOCUMENTS

| | | |
|---|---|---|
| 2024/0170006 A1 | 5/2024 | Fu et al. |
| 2024/0205037 A1 | 6/2024 | Callegari |
| 2024/0338860 A1 | 10/2024 | Trzyna |
| 2024/0340193 A1 | 10/2024 | Zhu |
| 2024/0354493 A1 | 10/2024 | Nakajima et al. |
| 2024/0395254 A1 | 11/2024 | Fu et al. |
| 2024/0428800 A1 | 12/2024 | Lau et al. |
| 2025/0117128 A1 | 4/2025 | Omoigui |
| 2025/0140277 A1 | 5/2025 | Younes et al. |

FOREIGN PATENT DOCUMENTS

| | | |
|---|---|---|
| JP | 2018190431 | 11/2018 |
| JP | 6542983 | 7/2019 |

OTHER PUBLICATIONS

Tur et al., "The CALO Meeting Assistant System," *IEEE Transactions on Audio, Speech, and Language Processing*, vol. 18, No. 6, pp. 1601-1611, Aug. 2010.

United States Patent and Trademark Office, Office Action mailed May 11, 2023, in U.S. Appl. No. 17/210,108.

United States Patent and Trademark Office, Notice of Allowance mailed Oct. 12, 2023, in U.S. Appl. No. 17/210,108.

United States Patent and Trademark Office, Office Action mailed Dec. 7, 2022, in U.S. Appl. No. 17/863,837.

United States Patent and Trademark Office, Office Action mailed Jul. 5, 2023, in U.S. Appl. No. 17/863,837.

United States Patent and Trademark Office, Office Action mailed Oct. 17, 2023, in U.S. Appl. No. 17/863,837.

United States Patent and Trademark Office, Office Action mailed Dec. 7, 2022, in U.S. Appl. No. 17/863,881.

United States Patent and Trademark Office, Office Action mailed Jul. 5, 2023, in U.S. Appl. No. 17/863,881.

United States Patent and Trademark Office, Office Action mailed Oct. 24, 2023, in U.S. Appl. No. 17/863,881.

United States Patent and Trademark Office, Notice of Allowance mailed Mar. 4, 2024, in U.S. Appl. No. 17/863,881.

United States Patent and Trademark Office, Office Action mailed Jun. 8, 2023, in U.S. Appl. No. 18/127,343.

United States Patent and Trademark Office, Office Action mailed Sep. 20, 2023, in U.S. Appl. No. 18/127,343.

United States Patent and Trademark Office, Notice of Allowance mailed Dec. 13, 2023, in U.S. Appl. No. 18/127,343.

United States Patent and Trademark Office, Notice of Allowance mailed Mar. 25, 2024, in U.S. Appl. No. 18/127,343.

United States Patent and Trademark Office, Office Action mailed Nov. 15, 2023, in U.S. Appl. No. 18/131,982.

United States Patent and Trademark Office, Office Action mailed Mar. 25, 2024, in U.S. Appl. No. 18/140,981.

United States Patent and Trademark Office, Office Action mailed Jun. 5, 2024, in U.S. Appl. No. 17/863,837.

United States Patent and Trademark Office, Office Action mailed Sep. 9, 2024, in U.S. Appl. No. 17/863,837.

United States Patent and Trademark Office, Notice of Allowance mailed Aug. 15, 2024, in U.S. Appl. No. 18/127,343.

United States Patent and Trademark Office, Office Action mailed Apr. 4, 2024, in U.S. Appl. No. 18/131,982.

United States Patent and Trademark Office, Office Action mailed Jul. 26, 2024, in U.S. Appl. No. 18/131,982.

United States Patent and Trademark Office, Notice of Allowance mailed Aug. 5, 2024, in U.S. Appl. No. 18/140,981.

United States Patent and Trademark Office, Office Action mailed Aug. 15, 2024, in U.S. Appl. No. 18/514,666.

United States Patent and Trademark Office, Office Action mailed Sep. 10, 2024, in U.S. Appl. No. 18/673,235.

United States Patent and Trademark Office, Office Action mailed Aug. 13, 2024, in U.S. Appl. No. 18/744,259.

United States Patent and Trademark Office, Notice of Allowance mailed May 8, 2025, in U.S. Appl. No. 17/863,837.

United States Patent and Trademark Office, Notice of Allowance mailed Jun. 23, 2025, in U.S. Appl. No. 18/131,982.

United States Patent and Trademark Office, Notice of Allowance mailed Apr. 30, 2025, in U.S. Appl. No. 18/140,981.

United States Patent and Trademark Office, Notice of Allowance mailed Apr. 25, 2025, in U.S. Appl. No. 18/514,666.

United States Patent and Trademark Office, Notice of Allowance mailed Jul. 8, 2025, in U.S. Appl. No. 18/673,235.

United States Patent and Trademark Office, Notice of Allowance mailed Jul. 8, 2025, in U.S. Appl. No. 18/737,530.

United States Patent and Trademark Office, Notice of Allowance mailed Mar. 26, 2025, in U.S. Appl. No. 17/863,837.

United States Patent and Trademark Office, Office Action mailed Jan. 22, 2025, in U.S. Appl. No. 18/131,982.

United States Patent and Trademark Office, Notice of Allowance mailed Oct. 10, 2024, in U.S. Appl. No. 18/140,981.

United States Patent and Trademark Office, Office Action mailed Jan. 24, 2025, in U.S. Appl. No. 18/514,666.

United States Patent and Trademark Office, Office Action mailed Jan. 28, 2025, in U.S. Appl. No. 18/673,235.

United States Patent and Trademark Office, Office Action mailed Feb. 7, 2025, in U.S. Appl. No. 18/744,259.

United States Patent and Trademark Office, Office Action mailed Jan. 29, 2025, in U.S. Appl. No. 18/737,530.

United States Patent and Trademark Office, Notice of Allowance mailed Aug. 13, 2025, in U.S. Appl. No. 18/744,259.

\* cited by examiner

SYSTEMS AND METHODS FOR AUTOMATIC SCREEN CAPTURES BY A VIRTUAL MEETING PARTICIPANT

CROSS-REFERENCES TO RELATED APPLICATIONS

This application claims priority to Provisional Patent Application No. 63/444,798, filed Feb. 10, 2023, which is incorporated herein by reference in its entirety for all purposes. U.S. patent application Ser. No. 17/678,676 is incorporated by reference herein for all purposes.

FIELD OF THE DISCLOSURE

Some embodiments of the present disclosure are related to a virtual meeting participant (e.g., a virtual assistant). More particularly, certain embodiments of the present disclosure provide systems and methods for a virtual meeting participant for media services. Merely by way of example, the present disclosure has been applied to using the screen captures (e.g., automatically captured screen captures) via a virtual meeting participant, but it would be recognized that the present disclosure has much broader range of applicability.

BACKGROUND

Conversations, such as human-to-human conversations, include information that is often difficult to comprehensively, efficiently, and accurately extract, using conventional methods and systems. For example, conventional note-taking performed during a conversation not only distracts the note-taker from the conversation but can also lead to inaccurate recordation of information due to human-error, such as for human's inability to multitask well and process information efficiently with high accuracy in real time. Hence it is highly desirable to provide systems and methods for capturing, processing, and rendering conversations (e.g., in an automatic manner) to increase the value of conversations, such as human-to-human conversations, at least by increasing the comprehensiveness and accuracy of information extractable from the conversations.

BRIEF SUMMARY OF THE DISCLOSURE

Some embodiments of the present disclosure are related to a virtual meeting participant (e.g., a virtual assistant). More particularly, certain embodiments of the present disclosure provide systems and methods for a virtual meeting participant for media services. Merely by way of example, the present disclosure has been applied to using the screen captures (e.g., automatically captured screen captures) via a virtual meeting participant, but it would be recognized that the present disclosure has much broader range of applicability.

According to certain embodiments, a computer-implemented method for transcribing a conversation, the method comprises: obtaining, via a virtual participant, a set of audio data associated with a conversation while the conversation occurs; transcribing, via the virtual participant, the set of audio data into a set of text data while the conversation occurs; receiving a set of screen captures associated with the conversation; deduplicating the set of screen captures to generate a set of deduplicated screen captures; and generating a transcript of the conversation based at least in part on the set of text data and the set of deduplicated screen captures.

According to some embodiments, a computing system for transcribing a conversation, the system comprises: one or more memories including instructions stored thereon; and one or more processors configured to execute the instructions and perform operations comprising: obtaining, via a virtual participant, a set of audio data associated with a conversation while the conversation occurs; transcribing, via the virtual participant, the set of audio data into a set of text data while the conversation occurs; receiving a set of screen captures associated with the conversation; deduplicating the set of screen captures to generate a set of deduplicated screen captures; and generating a transcript of the conversation based at least in part on the set of text data and the set of deduplicated screen captures.

According to certain embodiments, a non-transitory computer-readable medium storing instructions for transcribing a conversation, the instructions upon execution by one or more processors of a computing system, cause the computing system to perform one or more operations including: obtaining, via a virtual participant, a set of audio data associated with a conversation while the conversation occurs; transcribing, via the virtual participant, the set of audio data into a set of text data while the conversation occurs; receiving a set of screen captures associated with the conversation; deduplicating the set of screen captures to generate a set of deduplicated screen captures; and generating a transcript of the conversation based at least in part on the set of text data and the set of deduplicated screen captures.

Depending upon the embodiment, one or more benefits may be achieved. These benefits, features, and advantages of the present disclosure can be fully appreciated with reference to the detailed description and accompanying drawings that follow.

Figure 1:
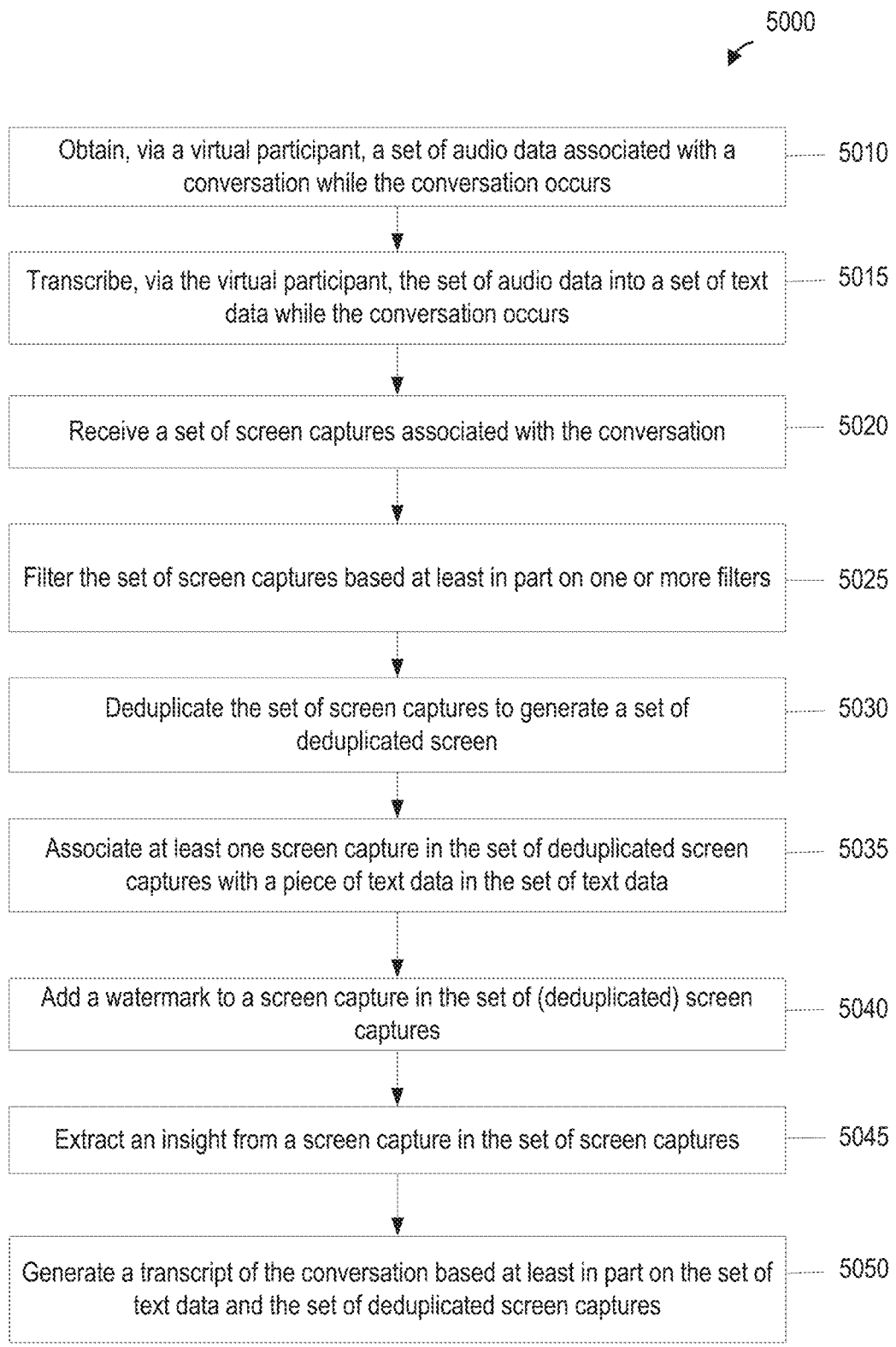
FIG. 1 is a simplified diagram showing a method for generating a transcript of a conversation (e.g., a meeting, an online meeting, etc.) with the use of screen captures (e.g., visual data), according to certain embodiments of the present disclosure.

While the present disclosure is amenable to various modifications and alternative forms, specific embodiments have been shown by way of example in the drawings and are described in detail below. The present disclosure is intended to cover all modifications, equivalents, and alternatives falling within the scope of the present disclosure as defined by the appended claims.

DETAILED DESCRIPTION OF THE DISCLOSURE

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information. Some embodiments of the present disclosure are related to a virtual meeting participant (e.g., a virtual assistant). More particularly, certain embodiments of the present disclosure provide systems and methods for a virtual meeting participant for media services. Merely by way of example, the present disclosure has been applied to using the screen captures (e.g., automatically captured screen captures) via a virtual meeting participant, but it would be recognized that the present disclosure has much broader range of applicability.

According to some embodiments, systems and/or methods of the present disclosure automatically capture and/or record one or more screen captures (e.g., one or more visual data, one or more images, one or more sequences of images, one or more videos, one or more video snippets, one or more captured screens). In some examples, a video snippet is a section of a video. In certain embodiments, systems and/or methods of the present disclosure automatically capture one or more screens by a virtual meeting participant (e.g., a virtual assistant). In some embodiments, a virtual assistant can join a meeting (e.g., with a visual representation of the virtual assistant, as a named participant to the meeting, etc.), record a meeting, transcribe a meeting, and/or provide other functionalities. In certain embodiments, systems and/or methods of the present disclosure (e.g., a virtual assistant system and/or a media service system) can perform automatic screen captures and embed screen captures (e.g., one or more visual data, one or more images, one or more videos) into meeting transcriptions (e.g., the transcribed meetings). In some embodiments, a virtual assistant system integrates with a media service system to provide various functions for the virtual assistant system. In certain embodiments, the integrated virtual assistant system, also referred to as the virtual assistant or a virtual participant, can capture screens (e.g., automatically) and use the screen captures to improve transcriptions and/or embed screen captures into the transcripts.

According to certain embodiments, systems and/or methods of the present disclosure (e.g., a virtual assistant system and/or a media service system) capture one or more screens as one or more images and embed at least a part of the one or more images in meeting transcriptions (e.g., meeting notes, meeting emails). In some embodiments, the media service system is integrated with a virtual assistant. In some embodiments, images or visual data, also referred to as screen captures or captured screens, include one or more images, a sequence of images, one or more videos, and/or one or more video snippets. In some embodiments, the media service system deduplicates the one or more captured images to generate one or more embedded images. In certain embodiments, the media service system removes one or more images that are identified as duplicated to the previously captured images to generate a set of deduplicated images for a meeting. In some embodiments, the virtual assistant embeds the set of deduplicated images into a meeting transcription.

According to some embodiments, systems and/or methods of the present disclosure (e.g., the virtual assistant system and/or the media service system) filter out irrelevant screen captures (e.g., meeting images, meeting videos). In certain embodiments, the media service system uses a classifier to filter out screen captures. In some embodiments, the media service system uses an image classifier that detects whether a captured image is relevant or not. In certain embodiments, the media service system uses an image filter to filter out irrelevant screen captures. In some embodiments, the media service system automatically captures screen shares. In certain embodiments, systems and/or methods of the present disclosure (e.g., the virtual assistant system and/or the media service system the media service system) capture video as whole video and/or video snippets and embed them in the meeting transcripts (e.g., meeting notes, meeting emails).

According to some embodiments, systems and/or methods of the present disclosure (e.g., the media service system) watermark one or more embedded images (e.g., images, one or more videos) and/or image content. In certain embodiments, the media service system watermarks the one or more embedded images for security purposes. In some embodiments, the watermark relates to an origin and/or a source of the image. In certain embodiments, the watermark can be used to determine whether the use of the image is proper, for example, whether the use is in compliance with the privacy policy and/or whether the use is permitted. In some embodiments, the watermark may include or relate to an identifier, for example, a meeting identifier, a speaker identifier, and/or the like. In certain embodiments, the watermark is a digital watermark.

According to certain embodiments, systems and/or methods of the present disclosure (e.g., the virtual assistant system and/or the media service system) extract image insight and feedback into a virtual assistant system for enhancement and transcript augmentation. In some embodiments, the media service system performs content extraction (e.g., optical character recognition (OCR)) to the captured screens (e.g., meeting content) for ASR (automated speech recognition) improvement. For example, the media service system uses OCR to identify one or more terms and uses the one or more identified terms to improve speech recognition and meeting transcriptions. In certain embodiments, the media service system uses the extracted content for search improvements and/or predictive search improvements. In some embodiments, the media service system uses the extracted content to enhance outlining and meeting summarization.

According to some embodiments, systems and/or methods of the present disclosure (e.g., the media service system) extract knowledge and context from the captured screens (e.g., images, videos) to feedback into the virtual assistant system for improving features such as meeting insights, summarizing, and outlining. In certain embodiments, the media service system uses the extracted knowledge to improve and/or correct meeting transcriptions.

According to certain embodiments, systems and/or methods of the present disclosure (e.g., the virtual assistant system and/or the media service system) automatically highlight meeting content based on relevancy to participants. In some embodiments, the relevancy is individualized relevancy. In certain embodiments, different participants may have different relevancy (e.g., highlighted content). In some embodiments, the relevancy is determined based at least in part on one or more questions and/or one or more answers posted in a meeting. In certain embodiments, the relevancy is determined based at least in part on discussed action items and tasks. In some embodiments, the relevancy is determined based at least in part on one or more emphasized sections based on speech context, for example, such as this is exciting, important, participant reactions, and/or the like.

In certain embodiments, the virtual assistant system and/or the media service system highlight meeting content that ties to one or more captured screens in discussion. In some embodiments, the virtual assistant system and/or the media service system highlight content that is labeled (e.g., tabled) for a postponed (e.g., deferred) discussion. In certain embodiments, the virtual assistant system and/or the media service system embed video snippets and/or images based on highlighted text to capture a meeting mood.

According to some embodiments, systems and/or methods of the present disclosure (e.g., the virtual assistant system and/or the media service system) ask a virtual assistant to present on behalf of a meeting participant (e.g., owner). In certain embodiments, a user (e.g., a meeting participant, a user not participating the meeting) provides the virtual assistant (e.g., the virtual assistant system and/or the media service system) with a presentation and/or a pre-recorded video for a meeting. In some embodiments, the virtual assistant works with the meeting host to present content. In certain embodiments, the virtual assistant shares its screen and presents content to one or more meeting participants.

According to certain embodiments, the virtual assistant (e.g., the virtual assistant system and/or the media service system) responds to voice commands. In some embodiments, the virtual assistant receives a voice command to share transcriptions (e.g., "Hey, share transcript notes") and sends transcription notes to one or more participants in meetings for collaboration. In certain embodiments, the virtual assistant receives a voice command to start or stop automatic screen capture, and the virtual assistant starts or stops automatic screen capture according to the voice command. In some embodiments, the virtual assistant receives a voice command to present, pause presenting, or stop presenting, and the virtual assistant presents, pauses presenting, or stops presenting according to the received voice command. In certain embodiments, the virtual assistant receives a voice command to pause transcription, stop recording, or leave a meeting, and the virtual assistant pauses transcription, stops recording, or leaves a meeting according to the received voice command.

According to some embodiments, systems and/or methods of the present disclosure (e.g., the virtual assistant system and/or the media service system) generate a meeting template and/or a meeting agenda as framework and/or foundation of meeting based on a meeting type, for example, for meeting host and participants to follow. In certain embodiments, based on the meeting title (e.g., the meeting title in a calendar), description and participants, the media service system embeds a meeting template relevant to the content to be discussed to help participants with a meeting agenda and/or a meeting framework to use (e.g., to follow). In some embodiments, one or more meeting templates can be related to disciplines, for example, such as engineering, sales, business development, marketing, self-improvement, and/or the like.

According to certain embodiments, systems and/or methods of the present disclosure (e.g., the virtual assistant system and/or the media service system) generate a meeting summary outline. In some embodiments, the virtual assistant generates an outline as a bulleted list splitting a meeting into one or more meeting sections (e.g., chapters) with outline headings. In certain embodiments, the virtual assistant generates one or more action items and tags one or more participants for the action items that are captured during one or more meetings. In some embodiments, the virtual assistant generates a list of deferred decisions and/or a list of deferred discussions. In some embodiments, the virtual assistant emails (e.g., emails to one or more participants) meeting summary, outline, action items, captured images and/or next steps. In certain embodiments, the virtual assistant emails the meeting host to propose a follow-up meeting for one or more deferred discussions and/or one or more deferred decisions.

FIG. 1 is a simplified diagram showing a method 5000 for generating a transcript of a conversation (e.g., a meeting, an online meeting, etc.) with the use of screen captures (e.g., visual data), according to certain embodiments of the present disclosure. This diagram is merely an example. One of ordinary skill in the art would recognize many variations, alternatives, and modifications. The method 5000 for generating conversation summaries includes processes 5010, 5015, 5020, 5025, 5030, 5035, 5040, 5045, and 5050. Although the above has been shown using a selected group of processes for the method 5000 for generating conversation summaries, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 5000 are performed by a system (e.g., the computing system 100). In certain examples, some or all processes (e.g., steps) of the method 5000 are performed by a computer and/or a processor directed by a code. For example, a computer includes a server computer and/or a client computer (e.g., a personal computer). In some examples, some or all processes (e.g., steps) of the method 5000 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, the method 5000 includes a process 5010 of obtaining, via a virtual participant, a set of audio data associated with a conversation while the conversation occurs. In certain embodiments, a virtual participant (e.g., a virtual assistant 1000) includes a software module to capture audio data during a meeting or a conversation, generate a transcript from the audio data, for example, when the meeting or the conversation is on-going. In some embodiments, the method 5000 includes a process 5015 of transcribing, via the virtual participant, the set of audio data into a set of text data while the conversation occurs. In certain embodiments, the transcription is in real-time, for example, less than one (1) second or two (2) seconds between a speak time for a piece of audio data (e.g., a speaking of a word, a speaking of a part of a sentence, a speaking of a sentence, etc.) and a transcription time of generating the transcript for the piece of audio data.

According to certain embodiments, the method 5000 includes a process 5020 of receiving a set of screen captures (e.g., receiving video data and obtaining a set of images from the video data) associated with the conversation. In some embodiments, the set of screen captures are received from a media service system (e.g., a virtual meeting server, etc.). In certain embodiments, the virtual participant is configured to capture the set of screen captures. In some embodiments, a set of screen captures refer to a set of images obtained from video data. In certain embodiments, the method 5000 includes receiving and/or capturing video data or a video snippet and obtaining a set of images (e.g., a sequence of images) from the video data or the video snippet. In some embodiments, each screen capture in the set of screen captures has a corresponding timestamp. In certain embodiments, the timestamps of the set of screen captures are synchronized with timestamps associated with the set of audio data. In some embodiments, the virtual participant is configured to monitor whether a new screen capture becomes available.

According to some embodiments, the method 5000 includes a process 5025 of filtering the set of screen captures based at least in part on one or more filters. In certain embodiments, the one or more filters include a filter based at least in part on one selected from a group including an identifier, an access permission, an image classifier, a relevancy, content information, and/or the like. In some embodiments, the virtual participant (e.g., the virtual assistant 1000) and/or the system (e.g., the system 100) are configured to filter out at least one screen capture in the set of screen captures. In certain embodiments, the method 5000 includes a process of determining an image classifier for each screen capture in the set of screen captures and filtering out the at least one screen capture in the set of screen captures based at least in part on an image classifier corresponding to the at least one screen capture in the set of screen captures.

In certain embodiments, the virtual participant (e.g., the virtual assistant 1000) and/or the system (e.g., the system 100) is configured to extract metadata from at least one screen capture in the set of screen captures. In some embodiments, the virtual participant (e.g., the virtual assistant 1000) and/or the system (e.g., the system 100) are configured to determine whether a computing device has a permission for accessing the set of screen captures based on the extracted metadata; and in response to the client device having the permission for accessing the set of screen captures, allowing the computing device to access the set of screen captures.

According to certain embodiments, the method 5000 includes a process 5030 of deduplicating the set of screen captures to generate a set of deduplicated screen captures. In some embodiments, the virtual participant (e.g., the virtual assistant 1000) and/or the system (e.g., the system 100) are configured to a first screen capture in the set of screen captures; and receive a second screen capture in the set of screen captures subsequently. In certain embodiments, the method 5000 includes a process of conducting a similarity test between the first screen capture and the second screen capture to determine a similarity metric. In some embodiments, the method 5000 includes a process of evaluating whether the similarity metric meets one or more criteria. In certain embodiments, the one or more criteria include whether a determined similarity metric is higher than a threshold. In some embodiments, the one or more criteria include whether a determined similarity metric is lower than a threshold. In certain embodiments, the method 5000 includes a process of, if the similarity metric meets the one or more criteria (e.g., the second screen capture not similar to the first screen capture), updating the transcript by incorporating the second screen capture into the transcript.

In some embodiments, if the similarity metric does not meet the one or more criteria (e.g., the second screen capture similar to the first screen capture), the second screen capture is not included in the set of deduplicated screen captures. In certain embodiments, the one or more criteria includes a similarity threshold, such that the similarity metric higher than the similarity threshold indicates that the similarity is high and the similarity metric lower than the similarity threshold indicates that the similarity is low. In some embodiments, if the second screen capture is similar to the first screen capture, the second screen capture is not included (e.g., is excluded) in the set of deduplicated screen captures. In certain embodiments, if the second screen capture is not similar to the first screen capture, the second screen capture is added to the set of deduplicated screen captures. In certain embodiments, if the second screen capture is not similar to the first screen capture, the virtual participant (e.g., the virtual assistant 1000) and/or the system (e.g., the system 100) are configured to process and/or provide the second screen capture for processing.

According to some embodiments, the method 5000 includes a process of conducting a structural similarity index measure on the first screen capture and the second screen capture. In certain embodiments, the method 5000 includes a process of generating a first set of tiles from the first screen capture; generating a second set of tiles from the second screen capture; aligning the first set of tiles with the second set of tiles; and determining the similarity metric based on the aligned first set of tiles and the aligned second set of tiles. In some examples, the similarity metric includes a mean value of a set of tile similarity metrics, wherein a tile similarity metric is associated with one tile in the first set of tiles and one corresponding tile in the second set of tiles.

In certain embodiments, the method 5000 includes a process of conducting a similarity test between the first screen capture and the second screen capture includes: generating a first vector representing the first screen capture; generating a second vector representing the second screen capture; and determining a vector distance between the first vector and the second vector; where the similarity metric includes the vector distance.

In some embodiments, the method 5000 includes a process of modifying the first screen capture based at least in part on a template to generate a modified first screen capture; modifying the second screen capture based at least in part on the template to generate a modified second screen capture; and conducting the similarity test between the modified first screen capture and the modified second screen capture. In certain embodiments, a template includes a formality component for a type of conversion and/or meeting (e.g., a template for an organization, a template for a type of online meeting, etc.). In certain embodiments, the method 5000 includes a process of including the second screen capture for further processing, where the second screen capture is not similar to the first screen capture.

According to certain embodiments, the method 5000 includes a process 5040 of adding a watermark to a screen capture in the set of screen captures and/or in the set of deduplicated screen captures. In some embodiments, the method 5000 includes a process of generating a watermarked screen capture. In certain embodiments, the set of deduplicated screen captures includes the watermarked first screen capture. In some examples, the watermark is related to at least one selected from a group consisting of a security requirement, a privacy requirement, a permission, an image source, and an identifier. In certain examples, the virtual participant (e.g., the virtual assistant 1000) and/or the system (e.g., the system 100) are configured to provide a screen capture with a watermark to a first client device, but not to provide the screen capture with the watermark to a second client device, based at least in part on the watermark. In some examples, the watermark indicates a requirement (e.g., a permission requirement, a security requirement, a privacy requirement, etc.) and the second client device not satisfying the requirement is not provided with the screen capture.

According to some embodiments, the method 5000 includes a process 5045 of extracting an insight from at least one screen capture in the set of screen captures. In certain embodiments, the insight is extracted using a natural language processing model. In some embodiments, the insight is extracted using a language model (e.g., a large language model, a transformer, etc.). In certain embodiments, the method 5000 includes a process 5050 of generating a transcript of the conversation based at least in part on the set of text data and the set of deduplicated screen captures.

According to certain embodiments, the method 5000 includes a process of generating the transcript of the conversation based at least in part on the extracted insight. associating at least one screen capture in the set of deduplicated screen capture with a piece of text data in the set of text data. In some embodiments, each screen capture in the set of deduplicated screen captures is associated with a timestamp, where each screen capture is incorporated (e.g., embedded) into the transcript based at least in part on the timestamp.

According to some embodiments, the conversation includes a first person and a second person, where the method 5000 includes the process of adding a first annotation to the transcript based at least in part on one or more characteristics of the first person; adding a second annotation to the transcript based at least in part on one or more characteristics of the second person, the second annotation being different from the first annotation. In certain examples, one or more characteristics of a person includes at least one selected from a group consisting of a user identifier, a user permission, a user preference, a user relevancy, and/or the like. In some embodiments, the first annotation includes an annotation to a first part of the transcript and the second annotional includes an annotation to a second part of the transcription. In certain embodiments, the virtual participant (e.g., the virtual assistant 1000) and/or the system (e.g., the system 100) are configured to receive a voice command; and perform an action according to the voice command. In some embodiments, the voice command and/or the action is to start recording, start transcription, stop transcription, leave a meeting, and/or the like.

Figure 2:
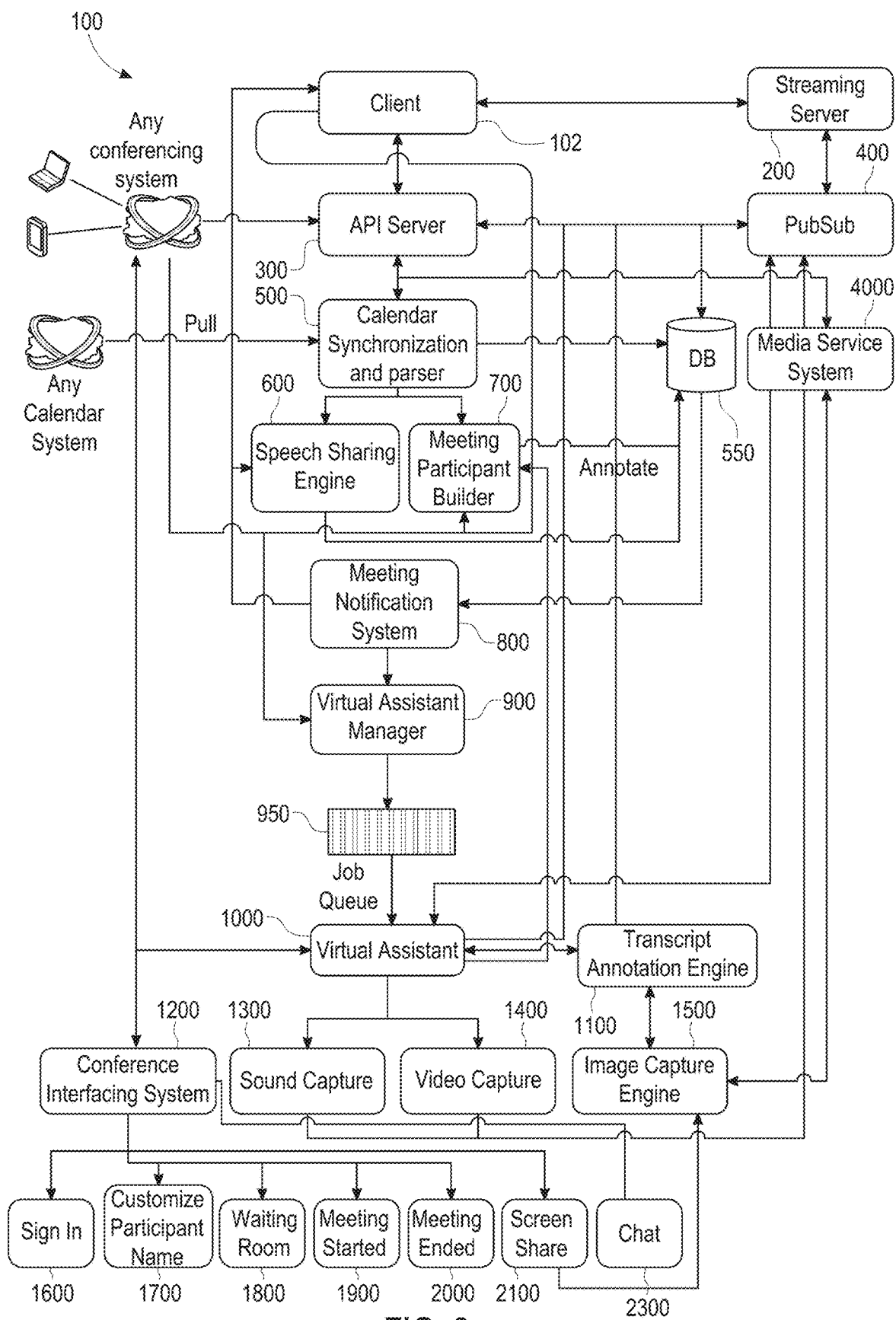
FIG. 2 is a simplified diagram showing a system for a virtual assistant enabling transcriptions and automatic screen captures for a meeting according to various embodiments of the present disclosure.

FIG. 2 is a simplified diagram showing a system 100 for a virtual assistant enabling transcriptions and automatic screen captures for a meeting according to various embodiments of the present disclosure. This diagram is merely an example, which should not unduly limit the scope of the claims. One of ordinary skill in the art would recognize many variations, alternatives, and modifications. In some examples, the system 100 includes a client device 102 (e.g., a client module deployed to a client device), a streaming server 200, an API (application programming interface) server 300, a PubSub ("publish-subscribe") module 400, a calendar synchronization and parser module 500, a data repository 550 (e.g., a database), a speech sharing engine 600, a meeting participant builder 700, a meeting notification system 800, a virtual assistant manager 900, a job queue module 950, a virtual assistant 1000 (e.g., a virtual participant, a virtual assistant module, a vendor agnostic virtual assistant, a virtual assistant system), a transcript annotation engine 1100, a conference interfacing system 1200, a sound capturing module 1300, a video capturing module 1400, an image capture engine 1500, a media service system 4000, and a plurality of sub-modules. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In certain embodiments, the virtual assistant 1000 interfaces with and/or coordinates with various components in the system 100. In some examples, the plurality of sub-modules includes a sign-in module 1600 for signing in, a customization module 1700 (e.g., customizing participant name), a waiting room module 1800, a meeting start module 1900, a meeting ended module 2000, a screen share module 2100 (e.g., screen capture), and/or a chat module 2300. One or more of the modules may work with a detector or include a detector to perform its function.

In some examples, the calendar synchronization and parser module 500 is configured to pull calendar information from a calendar system, such as an external calendar system, such as a calendar system operated by a third-party.

In some examples, the conference interfacing system 1200 is configured to interact with a conferencing system, such as an external conferencing system, such as one operated by a third-party. In certain examples, the conferencing system is accessible by a plurality of devices, such as a plurality of mobile devices of a plurality of users.

In some examples, the client module 102 may manually launch the virtual assistant manager 900 to perform one or more actions.

In some examples, the transcript annotation engine 1100 is configured to annotate captured content (e.g., video, picture, audio) and/or transmit the annotated captured content to the API server 300.

In certain embodiments, the media service system 4000 interfaces with the image capture engine 1500 to request and/or receive the one or more screen captures (e.g., one or more visual data, one or more images, one or more videos, one or more video snippets). In some embodiments, the media service system 4000 interfaces with the image capture engine 1500 to start screen captures and/or stop screen captures. In certain embodiments, the media service system 4000 interfaces with the API server 300 (e.g., an API service running on a server), for example, to publish images, to provide extracted knowledge and/or context, to provide OCR content, and/or the like. In some embodiments, the media service system 4000 interfaces with the API service 300 to receive one or more commands. In certain embodiments, the media service system 4000 interfaces with the virtual assistant 1000. In some embodiments, the media service system 4000 interfaces with the virtual assistant 1000 to receive one or more commands, for example, one or more voice commands.

In some embodiments, the data repository 550 can include audio data, visual data, transcripts, screen captures (e.g., snapshots, images, captured images, captured videos, etc.), extracted content, messages, events, annotations, account information, and/or the like. The repository 550 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the system 100 can execute software or firmware stored in non-transitory computer-readable medium to implement various processing steps. Various components and processors of the system 100 can be implemented by one or more computing devices including, but not limited to, circuits, a computer, a cloud-based processing unit, a processor, a processing unit, a microprocessor, a mobile computing device, and/or a tablet computer. In some cases, various components of the system 100 can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the system 100 can be implemented in software or firmware executed by a computing device.

Various components of the system 100 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 3:
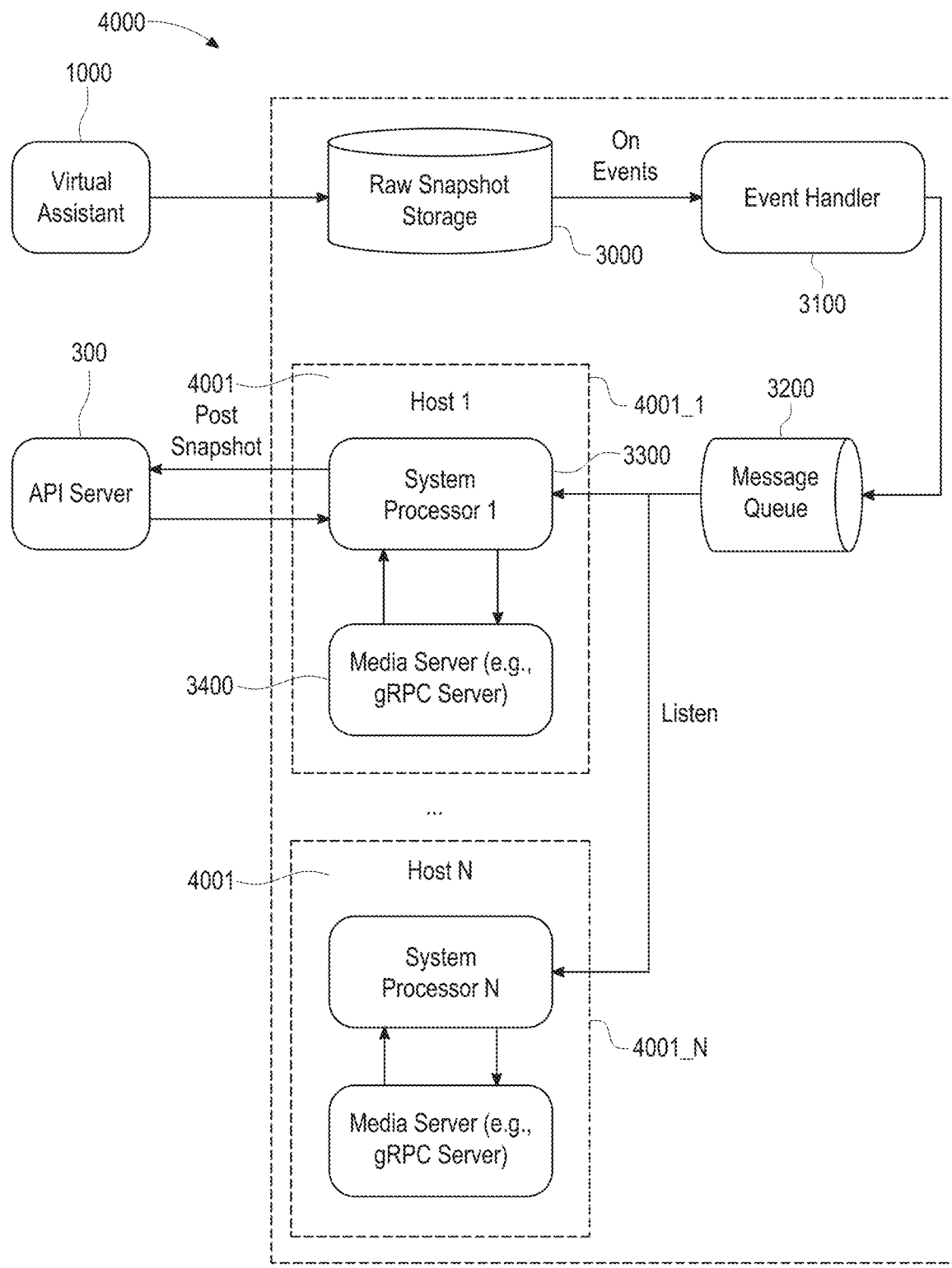
FIG. 3 is a simplified diagram showing the media service system interfacing with the API server and the virtual assistant according to various embodiments of the present disclosure.

FIG. 3 is a simplified diagram showing the media service system 4000 interfacing with the API server 300 and the virtual assistant 1000 according to various embodiments of the present disclosure. This diagram is merely an example, which should not unduly limit the scope of the claims. One of ordinary skill in the art would recognize many variations, alternatives, and modifications. In some examples, the media service system 4000 includes a raw snapshot (e.g., images, screen captures) storage 3000, an event handler 3100, a message queue 3200, and one or more host devices 4001 (e.g., the host device 4001_1, the host device 4001_N). Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In some embodiments, a host device 4001 includes a system processor 3300 and a media server 3400 (e.g., a gRPC server). In certain embodiments, the raw snapshot storage 3000 stores one or more screen captures (e.g., images, videos) captured by the virtual assistant 1000. In some embodiments, the event handler 3100 detects one or more new images (e.g., screen captures) uploaded by the virtual assistant 1000 and queues the one or more new images into a message queue 3200. In certain embodiments, the event handler 3100 generates a message when an event occurs, for example, one or more new screen captures are detected, metadata is detected for a screen capture, and/or the like. In certain embodiments, the message includes metadata associated with a screen capture (e.g., an image). In some embodiments, the message includes a command associated with a screen capture.

In certain embodiments, the host devices 4001 listen to the message queue 3200 and take actions when receiving a message. In some embodiments, the host device 4001, the system processor 3300 and/or the media server 3400 implement the knowledge extraction (such as but not limited to OCR) and deduplication logic to ensure quality results are posted back to the meeting (e.g., posting snapshots). In some embodiments, a snapshot is a screen capture. In some embodiments, a snapshot is a screen capture with annotations.

Figure 4:
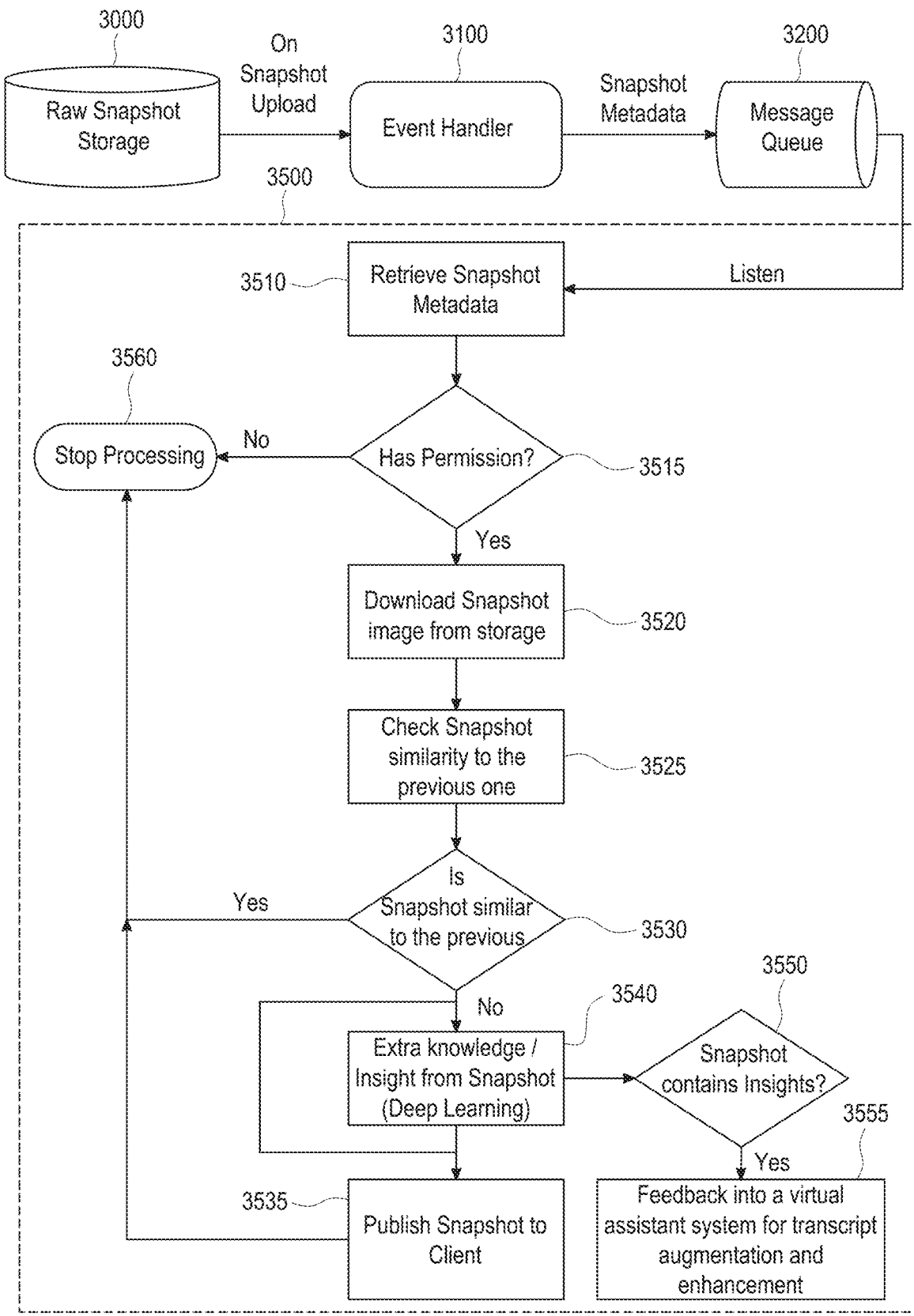
FIG. 4 is a simplified diagram showing a method for media services according to certain embodiments of the present disclosure.

FIG. 4 is a simplified diagram showing a method 3500 for media services according to certain embodiments of the present disclosure. This diagram is merely an example, which should not unduly limit the scope of the claims. One of ordinary skill in the art would recognize many variations, alternatives, and modifications. In some examples, the method 3500 includes the processes 3510, 3515, 3520, 3525, 3530, 3535, 3540, 3550, 3555, and 3560. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

According to certain embodiments, the method 3500 is associated with the raw snapshot storage 3000, the event handler 3100, and/or the message queue 3200. According to some embodiments, at process 3510, the system (e.g., the host device 4001, the media service system 4000) retrieves snapshot (e.g., screen captures) metadata, for example, when listening to the message queue 3200 and receives a message. In certain embodiments, at process 3515, the system determines whether the system has the permission (e.g., the user using the system has the permission) of using the snapshot. In some examples, the system associated with a first user (e.g., a virtual assistant instance for the first user) has the permission of using the snapshot and the system associated with a second user (e.g., a virtual assistant instance for the second user) does not have the permission of using the snapshot. In some embodiments, if the system does not have permission, the system will stop processing 3560, and go back to listening mode.

In certain embodiments, if the system has permission, the system performs the process 3520 of downloading the snapshot (e.g., the snapshot image, the snapshot video) from the storage (e.g., storage 3000). In some embodiments, at process 3525, the system checks the snapshot similarity to the previous snapshot. In certain embodiments, the system may use one or more image similarity determination approaches. In some examples, the system may generate vectors to represent images and determine vector distances between vectors to determine similarity. For example, the system may use a distance threshold to determine the similarity between images. In some examples, the system may use the method 4050 in FIG. 5 or a part of the method 4050 to determine the similarity between the snapshot and the previous snapshot. In certain embodiments, at process 3530, the system determines whether the snapshot is similar to the previous snapshot.

According to certain embodiments, if the snapshot is determined to be similar to the previous snapshot, the system will stop processing 3560. In some embodiments, if the snapshot is determined not to be similar to the previous snapshot, the system performs process 3535 and/or process 3540. In certain embodiments, at process 3535, the system (e.g., the API server 300) publishes the snapshot (e.g., the image) to the client (e.g., the client device). In some embodiments, at process 3540, the system (e.g., the host device 4001, the media service system 4000) extracts knowledge and/or insight from the snapshot (e.g., the media), for example, via a deep learning model. In certain examples, process 3540 includes an OCR process. In some examples, process 3540 includes a process of applying one or more machine learning models (e.g., deep learning models) to the snapshot (e.g., an image) to get (e.g., extract) context from the snapshot. In certain examples, the system (e.g., the virtual assistant 1000 and/or the media service system 4000) uses the context extracted from the snapshot to enhance the natural language processing (NLP) of a transcript. In some examples, the context includes a type of the meeting, for example, such as a board meeting, a seminar, a lecture, a webinar, and/or the like. In certain examples, the type of the meeting may indicate the number of actual participants (e.g., persons, persons in a conference room, persons online, etc.) besides one or more virtual participants (e.g., virtual assistant).

According to some embodiments, at process 3550, the system determines whether the snapshot contains insights. In certain embodiments, if the snapshot contains insights, the system (e.g., the host device 4001, the media service system 4000) provides feedback into a virtual assistant system (e.g., the system 100, the virtual assistant 1000) for transcript augmentation and enhancement. In some embodiments, one or more of the processes 3510, 3515, 3520, 3525, 3530, 3540, 3550, 3555, and/or 3560 are performed by the media service system 4000 and/or the host device 4001. In certain embodiments, the process 3535 is performed by the API server 300.

Figure 5:
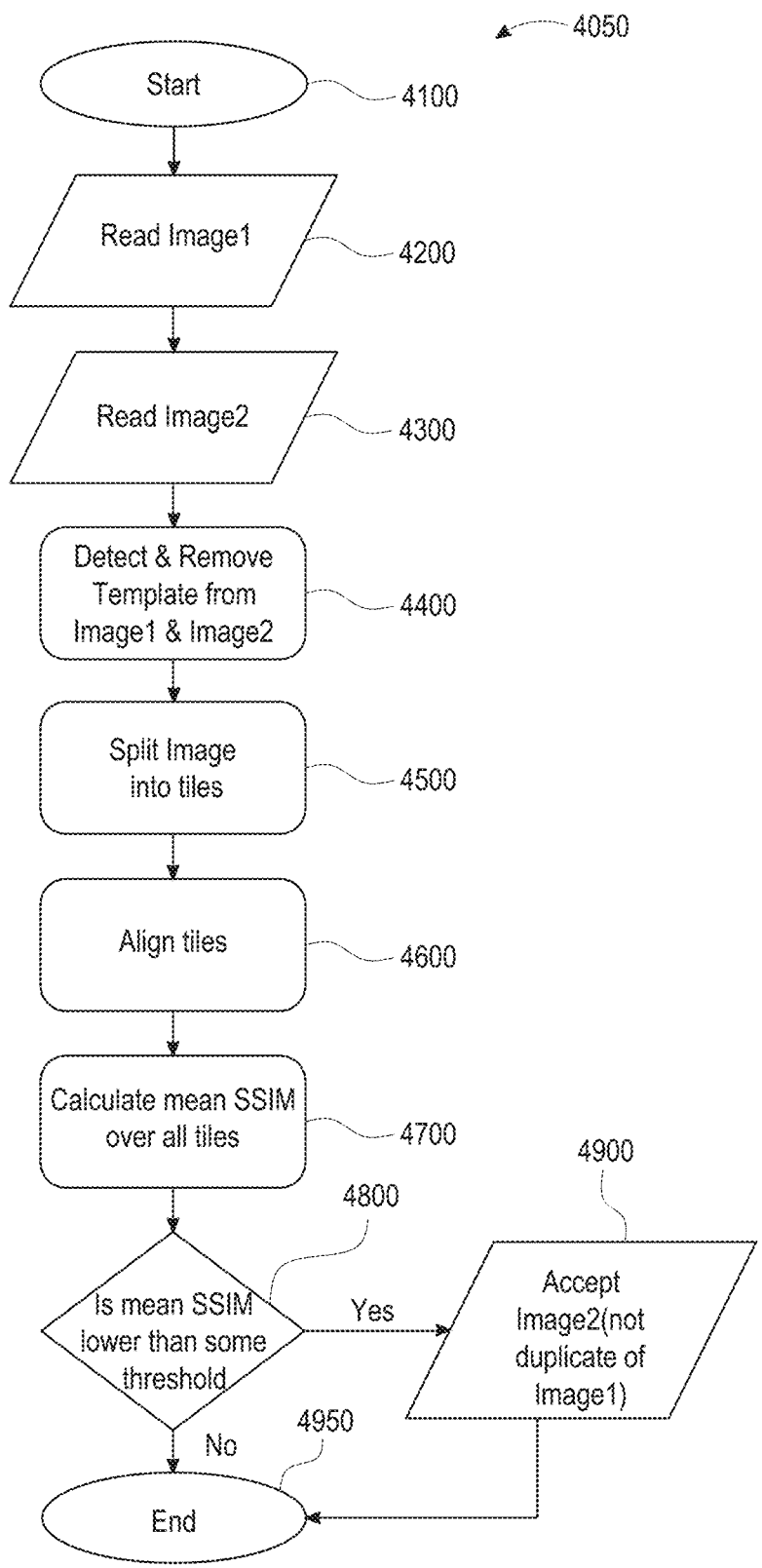
FIG. 5 is a simplified diagram showing a method for a deduplication process according to certain embodiments of the present disclosure.

FIG. 5 is a simplified diagram showing a method 4050 for a deduplication process according to certain embodiments of the present disclosure. This diagram is merely an example, which should not unduly limit the scope of the claims. One of ordinary skill in the art would recognize many variations, alternatives, and modifications. In some examples, the method 4050 includes processes 4100, 4200, 4300, 4400, 4500, 4600, 4700, 4800, 4900, and 4950. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

According to certain embodiments, the method 4050 is an example implementation of process 3525 and/or process 3530. In some examples, one or more processes of the method 4050 are performed by the host device 4001 and/or the media service system 4000. In certain embodiments, the method 4050 includes a start process 4100, a process 4200 of reading Image1 (e.g., from the storage 3000), and/or a process 4300 of reading Image2 (e.g., from the storage 3000). In some examples, at process 4400, the system (e.g., the host device 4001, the media service system 4000) detects and removes a template (e.g., a meeting template) from Image1 and/or Image2. In certain embodiments, a template refers to a part of the screen capture that does not include meeting content (e.g., shared content). For example, the template includes a part of the screen capture including the participants' names and/or image representations.

In some embodiments, the method 4050 includes the process 4500 of splitting images (e.g., Image1, Image2) into tiles, the process 4600 of aligning the tiles, and/or the process 4700 of calculating mean SSIM (structural similarity index measure) over a part of or all tiles. In certain embodiments, at process 4800, the system determines whether the mean SSIM is lower than a threshold (e.g., some threshold, a predetermined threshold). In some examples, using the mean SSIM of multiple tiles can improve the performance of similarity determination, for example, reducing false positives. In some embodiments, if the mean SSIM is lower than the threshold (e.g., low similarity), at process 4900, the system accepts Image2 (e.g., not a duplicate of Image1). In certain embodiments, if the mean SSIM is not lower than the threshold (e.g., high similarity), the system performs end process 4950. In some embodiments, the method 4050 includes the end process 4950.

According to certain embodiments, a computer-implemented method for transcribing a conversion, the method comprising: obtaining, via a virtual participant, a set of audio data associated with a conversation while the conversation occurs; transcribing, via the virtual participant, the set of audio data into a set of text data while the conversation occurs; receiving a set of screen captures associated with the conversation; deduplicating the set of screen captures to generate a set of deduplicated screen captures; and generating a transcript of the conversation based at least in part on the set of text data and the set of deduplicated screen captures. For example, the method is implemented according to at least FIG. 1, FIG. 2, FIG. 3, FIG. 4, and/or FIG. 5.

In some embodiments, the receiving a set of screen captures includes: receiving a first screen capture in the set of screen captures; and receiving a second screen capture in the set of screen captures subsequently; wherein the method further comprises: conducting a similarity test between the first screen capture and the second screen capture to determine a similarity metric; evaluating whether the similarity metric meets one or more criteria; and if the similarity metric meets the one or more criteria, updating the transcript by incorporating the second screen capture into the transcript. In certain embodiments, the conducting a similarity test between the first screen capture and the second screen capture includes conducting a structural similarity index measure on the first screen capture and the second screen capture. In some embodiments, the conducting a similarity test between the first screen capture and the second screen capture includes: generating a first set of tiles from the first screen capture; generating a second set of tiles from the second screen capture; aligning the first set of tiles with the second set of tiles; and determining the similarity metric based on the aligned first set of tiles and the aligned second set of tiles.

In certain embodiments, the similarity metric includes a mean value of a set of tile similarity metrics, wherein a tile similarity metric is associated with one tile in the first set of tiles and one corresponding tile in the second set of tiles. In some embodiments, the conducting a similarity test between the first screen capture and the second screen capture includes: generating a first vector representing the first screen capture; generating a second vector representing the second screen capture; and determining a vector distance between the first vector and the second vector; wherein the similarity metric includes the vector distance. In certain embodiments, the conducting a similarity test between the first screen capture and the second screen capture includes: modifying the first screen capture based at least in part on a template to generate a modified first screen capture; modifying the second screen capture based at least in part on the template to generate a modified second screen capture; and conducting the similarity test between the modified first screen capture and the modified second screen capture.

In some embodiments, the method further comprises: filtering out at least one screen capture in the set of screen captures. In certain embodiments, the method further comprises: determining an image classifier for each screen capture in the set of screen captures; wherein the filtering out at least one screen capture in the set of screen captures includes filtering out the at least one screen capture in the set of screen captures based at least in part on an image classifier corresponding to the at least one screen capture in the set of screen captures. In some embodiments, the method further comprises: extracting metadata from at least one screen capture in the set of screen captures; determining whether a computing device has a permission for accessing the set of screen captures based on the extracted metadata; and in response to the computing device having the permission for accessing the set of screen captures, allowing the computing device to access the set of screen captures. In certain embodiments, the method further comprises adding a watermark to a first screen capture in the set of screen captures to generate a watermarked first screen capture, wherein the set of deduplicated screen captures includes the watermarked first screen capture. In some embodiments, the watermark is related to at least one selected from a group consisting of a security requirement, a privacy requirement, a permission, an image source, and an identifier.

In certain embodiments, at least one screen capture in the set of screen captures is a video. In some embodiments, the method further comprises: extracting an insight from at least one screen capture in the set of screen captures; wherein the generating a transcript of the conversation includes generating the transcript of the conversation based at least in part on the extracted insight. In certain embodiments, the extracting an insight from at least one screen capture in the set of screen captures includes extracting the insight using a natural language processing model. In some embodiments, the extracting an insight from at least one screen capture in the set of screen captures includes extracting the insight using a language model.

According to some embodiments, a computing system for transcribing a conversation, the system comprising: one or more memories including instructions stored thereon; and one or more processors configured to execute the instructions and perform operations comprising: obtaining, via a virtual participant, a set of audio data associated with a conversation while the conversation occurs; transcribing, via the virtual participant, the set of audio data into a set of text data while the conversation occurs; receiving a set of screen captures associated with the conversation; deduplicating the set of screen captures to generate a set of deduplicated screen captures; and generating a transcript of the conversation based at least in part on the set of text data and the set of deduplicated screen captures. For example, the system is implemented according to at least FIG. 1, FIG. 2, FIG. 3, FIG. 4, and/or FIG. 5.

In some embodiments, the receiving a set of screen captures includes: receiving a first screen capture in the set of screen captures; and receiving a second screen capture in the set of screen captures subsequently; wherein the operations further comprise: conducting a similarity test between the first screen capture and the second screen capture to determine a similarity metric; evaluating whether the similarity metric meets one or more criteria; and if the similarity metric meets the one or more criteria, updating the transcript by incorporating the second screen capture into the transcript. In certain embodiments, the conducting a similarity test between the first screen capture and the second screen capture includes conducting a structural similarity index measure on the first screen capture and the second screen capture. In some embodiments, the conducting a similarity test between the first screen capture and the second screen capture includes: generating a first set of tiles from the first screen capture; generating a second set of tiles from the second screen capture; aligning the first set of tiles with the second set of tiles; and determining the similarity metric based on the aligned first set of tiles and the aligned second set of tiles.

In certain embodiments, the similarity metric includes a mean value of a set of tile similarity metrics, wherein a tile similarity metric is associated with one tile in the first set of tiles and one corresponding tile in the second set of tiles. In some embodiments, the conducting a similarity test between the first screen capture and the second screen capture includes: generating a first vector representing the first screen capture; generating a second vector representing the second screen capture; and determining a vector distance between the first vector and the second vector; wherein the similarity metric includes the vector distance. In certain embodiments, the conducting a similarity test between the first screen capture and the second screen capture includes: modifying the first screen capture based at least in part on a template to generate a modified first screen capture; modifying the second screen capture based at least in part on the template to generate a modified second screen capture; and conducting the similarity test between the modified first screen capture and the modified second screen capture.

In some embodiments, the operations further comprise: filtering out at least one screen capture in the set of screen captures. In certain embodiments, the operations further comprise: determining an image classifier for each screen capture in the set of screen captures; wherein the filtering out at least one screen capture in the set of screen captures includes filtering out the at least one screen capture in the set of screen captures based at least in part on an image classifier corresponding to the at least one screen capture in the set of screen captures. In some embodiments, the operations further comprise: extracting metadata from at least one screen capture in the set of screen captures; determining whether a computing device has a permission for accessing the set of screen captures based on the extracted metadata; and in response to the computing device having the permission for accessing the set of screen captures, allowing the computing device to access the set of screen captures. In certain embodiments, the operations further comprise adding a watermark to a first screen capture in the set of screen captures to generate a watermarked first screen capture, wherein the set of deduplicated screen captures includes the watermarked first screen capture. In some embodiments, the watermark is related to at least one selected from a group consisting of a security requirement, a privacy requirement, a permission, an image source, and an identifier.

In certain embodiments, at least one screen capture in the set of screen captures is a video. In some embodiments, the operations further comprise: extracting an insight from at least one screen capture in the set of screen captures; wherein the generating a transcript of the conversation includes generating the transcript of the conversation based at least in part on the extracted insight. In certain embodiments, the extracting an insight from at least one screen capture in the set of screen captures includes extracting the insight using a natural language processing model. In some embodiments, the extracting an insight from at least one screen capture in the set of screen captures includes extracting the insight using a language model.

According to certain embodiments, a non-transitory computer-readable medium storing instructions for transcribing a conversation, the instructions upon execution by one or more processors of a computing system, cause the computing system to perform one or more operations including: obtaining, via a virtual participant, a set of audio data associated with a conversation while the conversation occurs; transcribing, via the virtual participant, the set of audio data into a set of text data while the conversation occurs; receiving a set of screen captures associated with the conversation; deduplicating the set of screen captures to generate a set of deduplicated screen captures; and generating a transcript of the conversation based at least in part on the set of text data and the set of deduplicated screen captures. For example, the non-transitory computer-readable medium is implemented according to at least FIG. 1, FIG. 2, FIG. 3, FIG. 4, and/or FIG. 5.

In some embodiments, the receiving a set of screen captures includes: receiving a first screen capture in the set of screen captures; and receiving a second screen capture in the set of screen captures subsequently; wherein the operations further comprise: conducting a similarity test between the first screen capture and the second screen capture to determine a similarity metric; evaluating whether the similarity metric meets one or more criteria; and if the similarity metric meets the one or more criteria, updating the transcript by incorporating the second screen capture into the transcript. In certain embodiments, the conducting a similarity test between the first screen capture and the second screen capture includes conducting a structural similarity index measure on the first screen capture and the second screen capture. In some embodiments, the conducting a similarity test between the first screen capture and the second screen capture includes: generating a first set of tiles from the first screen capture; generating a second set of tiles from the second screen capture; aligning the first set of tiles with the second set of tiles; and determining the similarity metric based on the aligned first set of tiles and the aligned second set of tiles.

In certain embodiments, the similarity metric includes a mean value of a set of tile similarity metrics, wherein a tile similarity metric is associated with one tile in the first set of tiles and one corresponding tile in the second set of tiles. In some embodiments, the conducting a similarity test between the first screen capture and the second screen capture includes: generating a first vector representing the first screen capture; generating a second vector representing the second screen capture; and determining a vector distance between the first vector and the second vector; wherein the similarity metric includes the vector distance. In certain embodiments, the conducting a similarity test between the first screen capture and the second screen capture includes: modifying the first screen capture based at least in part on a template to generate a modified first screen capture; modifying the second screen capture based at least in part on the template to generate a modified second screen capture; and conducting the similarity test between the modified first screen capture and the modified second screen capture.

In some embodiments, the operations further comprise: filtering out at least one screen capture in the set of screen captures. In certain embodiments, the operations further comprise: determining an image classifier for each screen capture in the set of screen captures; wherein the filtering out at least one screen capture in the set of screen captures includes filtering out the at least one screen capture in the set of screen captures based at least in part on an image classifier corresponding to the at least one screen capture in the set of screen captures. In some embodiments, the operations further comprise: extracting metadata from at least one screen capture in the set of screen captures; determining whether a computing device has a permission for accessing the set of screen captures based on the extracted metadata; and in response to the computing device having the permission for accessing the set of screen captures, allowing the computing device to access the set of screen captures. In certain embodiments, the operations further comprise adding a watermark to a first screen capture in the set of screen captures to generate a watermarked first screen capture, wherein the set of deduplicated screen captures includes the watermarked first screen capture. In some embodiments, the watermark is related to at least one selected from a group consisting of a security requirement, a privacy requirement, a permission, an image source, and an identifier.

In certain embodiments, at least one screen capture in the set of screen captures is a video. In some embodiments, the operations further comprise: extracting an insight from at least one screen capture in the set of screen captures; wherein the generating a transcript of the conversation includes generating the transcript of the conversation based at least in part on the extracted insight. In certain embodiments, the extracting an insight from at least one screen capture in the set of screen captures includes extracting the insight using a natural language processing model. In some embodiments, the extracting an insight from at least one screen capture in the set of screen captures includes extracting the insight using a language model.

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., SSD, RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A system for transcribing a conversation, the system comprising:
a virtual assistant system configured to:
  capture a set of audio data associated with a conversation while the conversation occurs; and
  automatically capture a set of screen captures associated with the conversation by at least:
    automatically capturing a first screen capture of the set of screen captures; and
    automatically capturing a second screen capture of the set of screen captures subsequently;
a data repository connected to the virtual assistant system and configured to:
  receive the first screen capture from the virtual assistant system;
  store the received first screen capture;
  receive the second screen capture from the virtual assistant system; and
  store the received second screen capture; and
a host device configured to:
  download the first screen capture and the second screen capture from the data repository;
  conduct a similarity test between the first screen capture and the second screen capture to determine a similarity metric by at least:
    generating a first set of tiles from the first screen capture;
    generating a second set of tiles from the second screen capture;
    aligning the first set of tiles with the second set of tiles; and
    determining the similarity metric based at least in part on the aligned first set of tiles and the second set of tiles;
  deduplicate the set of screen captures to generate a set of deduplicated screen captures based at least in part on the similarity metric;
  extract, using one or more machine learning models, an insight from at least one screen capture of the set of deduplicated screen captures;
  enhance a natural language processing model based at least in part on the extracted insight; and
  transmit the set of deduplicated screen captures to a server;

wherein the virtual assistant system is further configured to transcribe, using the enhanced natural language processing model, the set of audio data into a transcript of the conversation;

wherein the server is configured to:
receive the set of deduplicated screen captures from the host device; and
send the set of deduplicated screen captures to a client device to publish the set of deduplicated screen captures embedded in the transcript of the conversation.

2. The system of claim 1 wherein the host device is further configured to:
evaluate whether the similarity metric meets one or more criteria; and
if the similarity metric meets the one or more criteria, include the second screen capture in the set of deduplicated screen captures.

3. The system of claim 1 is further configured to:
add a watermark to the first screen capture to generate the watermarked first screen capture;
wherein the set of deduplicated screen captures includes the watermarked first screen capture.

4. The system of claim 3 wherein the server is further configured to send the watermarked first screen capture as a part of the set of deduplicated screen captures to the client device to publish the watermarked first screen capture embedded in the transcript of the conversation.

5. The system of claim 1 wherein:
the virtual assistant system is further configured to automatically capture the first screen capture associated with a timestamp; and
the server is further configured to send the first screen capture associated with the timestamp as a part of the set of deduplicated screen captures to the client device to publish the first screen capture embedded in the transcript based at least in part on the timestamp.

6. The system of claim 1 wherein at least one screen capture of the set of deduplicated screen captures is a video.

7. A system for transcribing a meeting, the system comprising:
a virtual assistant system configured to:
capture a set of audio data associated with a meeting while the meeting occurs;
transcribe the set of audio data into a set of text data while the meeting occurs;
automatically capture a first screen capture associated with the meeting; and
subsequently automatically capture a second screen capture associated with the meeting;
a data repository connected to the virtual assistant system and configured to:
receive the first screen capture from the virtual assistant system;
store the received first screen capture;
receive the second screen capture from the virtual assistant system; and
store the received second screen capture; and
a host device configured to:
download the first screen capture from the data repository;
generate a first set of tiles based at least in part on the first screen capture;
download the second screen capture from the data repository;
generate a second set of tiles based at least in part on the second screen capture;
align the first set of tiles with the second set of tiles;
determine a similarity metric based at least in part on the aligned first set of tiles and the second set of tiles;
evaluate whether the similarity metric satisfies one or more predetermined conditions; and
if the similarity metric satisfies the one or more predetermined conditions, process information associated with the second screen capture; and
transmit the second screen capture to a server;
wherein the virtual assistant system is further configured to, if the similarity metric satisfies the one or more predetermined conditions, generate a transcript of the meeting based on at least information associated with the second screen capture and the set of text data;
wherein the server is configured to, if the similarity metric satisfies the one or more predetermined conditions,
receive the second screen capture from the host device; and
send the second screen capture to a client device to publish the second screen capture embedded in the transcript of the meeting.

8. The system of claim 7 is further configured to add a watermark to the first screen capture to generate the watermarked first screen capture.

9. The system of claim 8 wherein the server is further configured to send the watermarked first screen capture to the client device to publish the watermarked first screen capture embedded in the transcript of the meeting.

10. The system of claim 7 wherein:
the virtual assistant system is further configured to automatically capture the first screen capture associated with a timestamp; and
the server is further configured to send the first screen capture to the client device to publish the first screen capture embedded in the transcript of the meeting based at least in part on the timestamp.

* * * * *